United States Patent
Lu

(10) Patent No.: US 11,160,416 B2
(45) Date of Patent: Nov. 2, 2021

(54) LID AND COOKING DEVICE

(71) Applicant: SUZHOU BAOSHENG ELECTRICAL APPLIANCE CO., LTD, Suzhou (CN)

(72) Inventor: Weiling Lu, Suzhou (CN)

(73) Assignee: SUZHOU BAOSHENG ELECTRICAL APPLIANCE CO. LTD, Suzhou (CN)

( * ) Notice: Subject to any disclaimer, the term of this patent is extended or adjusted under 35 U.S.C. 154(b) by 413 days.

(21) Appl. No.: 16/233,337

(22) Filed: Dec. 27, 2018

(65) Prior Publication Data

US 2020/0029730 A1    Jan. 30, 2020

(30) Foreign Application Priority Data

Jul. 24, 2018 (CN) .......................... 201810820153.9

(51) Int. Cl.
*A47J 36/06* (2006.01)
*A47J 27/00* (2006.01)
*G01K 1/14* (2021.01)
*A47J 37/12* (2006.01)

(52) U.S. Cl.
CPC ............. *A47J 36/06* (2013.01); *A47J 27/004* (2013.01); *A47J 37/128* (2013.01); *G01K 1/146* (2013.01); *A47J 2202/00* (2013.01)

(58) Field of Classification Search
CPC ...... A47J 36/06; A47J 37/128; A47J 2202/00; G01K 1/14; G01K 1/143; G01K 1/146; G01N 2001/2291
See application file for complete search history.

(56) References Cited

U.S. PATENT DOCUMENTS

| 3,950,632 | A | * | 4/1976 | Rivelli | A47J 37/1266 |
| | | | | | 219/523 |
| 4,200,982 | A | * | 5/1980 | Mueller | G01F 23/245 |
| | | | | | 33/715 |
| 2001/0040911 | A1 | * | 11/2001 | Rubenstein | G01K 1/14 |
| | | | | | 374/141 |
| 2007/0028780 | A1 | | 2/2007 | Popeil et al. | |

(Continued)

FOREIGN PATENT DOCUMENTS

| CN | 201630954 U | * | 11/2010 |
| CN | 102090840 B | | 11/2012 |

(Continued)

*Primary Examiner* — John J Norton
(74) *Attorney, Agent, or Firm* — Haug Partners LLP

(57) ABSTRACT

A lid comprises a cover body (10), a rotating member (20) and a sensor (30). The cover body has a cover end (12) in a closing direction. The rotating member comprises a rotating portion (21) and a connecting portion (22). The rotating portion is rotatably disposed at the cover end, and the rotational axis of the rotating portion is perpendicular to the closing direction. The connecting portion is disposed at the rotating portion and extends perpendicularly to the rotational axis of the rotating portion. The sensor is disposed at the connecting portion and can rotate between an inoperative position near the cover end (12) and the working position away from the cover end under the driving of the rotating portion. The lid is capable of accurately detecting and controlling the temperature inside a cooking device, and accommodating the sensor.

7 Claims, 10 Drawing Sheets

(56) References Cited

U.S. PATENT DOCUMENTS

| | | | | |
|---|---|---|---|---|
| 2007/0210062 A1* | 9/2007 | Gaynor | ............... | A47J 27/004 219/442 |
| 2008/0175301 A1* | 7/2008 | Chen | ..................... | G01J 5/02 374/121 |
| 2013/0127096 A1* | 5/2013 | Wunsche | ............ | G01N 33/205 266/99 |
| 2015/0037482 A1* | 2/2015 | Fung | .................. | A47J 37/0611 426/523 |
| 2015/0190012 A1* | 7/2015 | Kumon | .................. | B01F 7/16 99/348 |

FOREIGN PATENT DOCUMENTS

| | | | | | |
|---|---|---|---|---|---|
| CN | 104083078 | B | | 8/2016 | |
| CN | 207007359 | U | * | 2/2018 | |
| DE | 2217468 | A1 | * | 10/1973 | ............ A47J 41/005 |
| EP | 2833762 | B1 | | 6/2018 | |
| JP | 7194488 | A | | 8/1995 | |
| JP | 20144150 | A | | 1/2014 | |
| KR | 1020060056647 | A | | 5/2006 | |
| WO | 2016/206622 | | | 12/2016 | |
| WO | WO-2018205529 | A1 | * | 11/2018 | ............ A47J 27/004 |

\* cited by examiner

LID AND COOKING DEVICE

CROSS-REFERENCE TO RELATED APPLICATIONS

This application claims priority to Chinese Patent Application CN201810820153.9 filed on 24 Jul. 2018.

FIELD OF THE INVENTION

At least some embodiments of the disclosure relate to a lid, in particular to a lid having a temperature detecting and temperature controlling function and a cooking device comprising the lid.

BACKGROUND OF THE INVENTION

The conventional temperature control pot (especially the rice cooker, slow cooker, deep fryer, and airfryer) measures the temperature inside the pot through a temperature sensor and evaluates the cooking state of the food from the measured temperature value, thereby controls the cooking time to achieve the best food taste.

Most of the conventional temperature sensors of these pots are located at the bottom of the pot and can be easily damaged since the food is also located at the bottom of the pot. If we dispose the temperature sensor on the lid, the temperature sensor needs to be as close as possible to the food for improving the accuracy of the temperature measurement. Therefore, it is necessary to extend the temperature sensor into the cavity of the pot. However, the temperature sensor is difficult to install in this case, and the temperature sensor is exposed to the food and easily damaged.

BRIEF DESCRIPTION OF THE DRAWINGS

A wide variety of potential practical and useful embodiments will be more readily understood through the following detailed description of certain exemplary embodiments, concerning the accompanying exemplary drawings in which.

Figure 1:
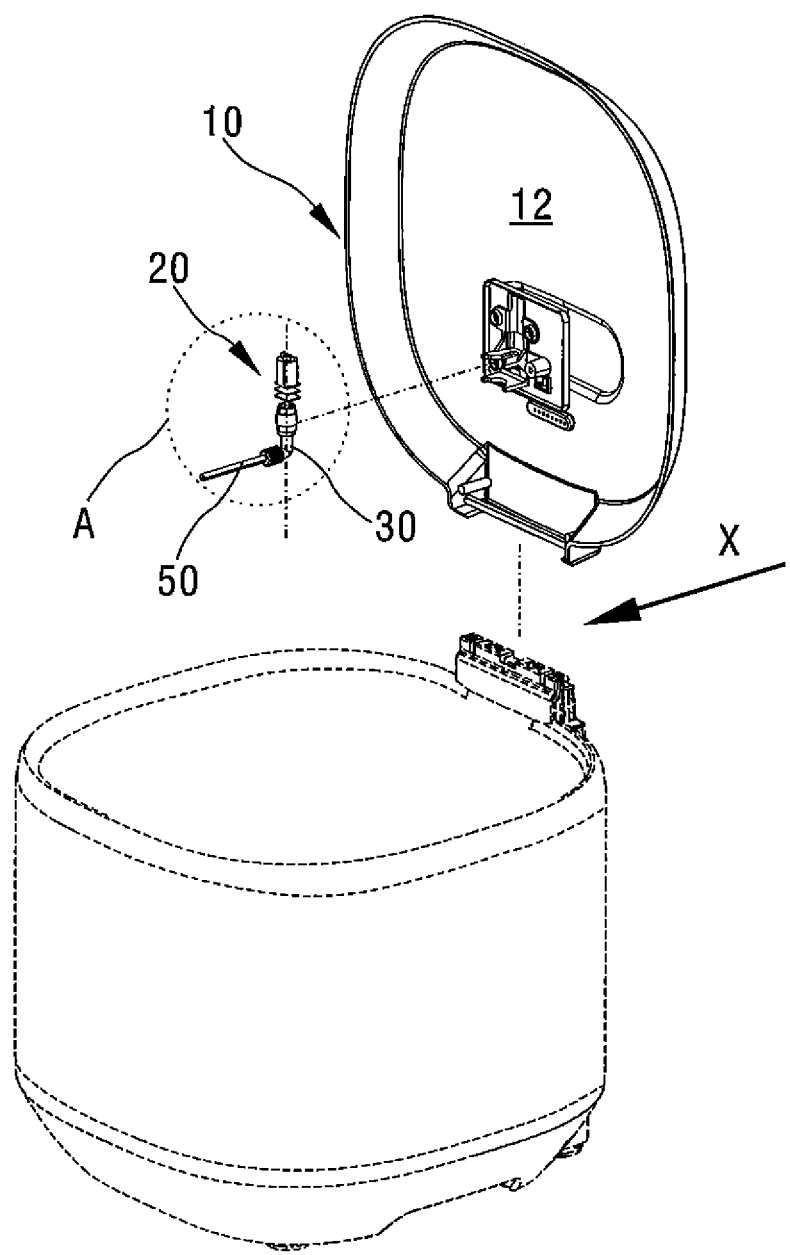
FIG. 1 is an exploded view showing an exemplary cooking device.

PARTS AND NUMBERS 10 cover body
12 cover end
20 rotating member
21 rotating portion
22 connecting portion
30 sensor
32 temperature measuring end
41 drive gear
42 transmission gear
50 driving member
51 rod
X closing direction.

DETAILED DESCRIPTION OF THE EMBODIMENTS

The above and other objects, features and other advantages of the present invention will be more clearly understood from the following detailed description taken in conjunction with the accompanying drawings. It should be noted that like reference numerals refer to like parts throughout the several views.

The views do not represent the structure and proportion of the actual products using the present disclosure.

"Exemplary" means "serving as an example, instance or description" and any illustration or embodiment described herein as "exemplary" should not be construed as a more preferred or advantageous technical solution.

FIG. 1 is an exploded view showing an exemplary cooking device. As shown in FIG. 1, the lid of the cooking device comprises a cover body 10, a rotating member 20 and a sensor 30. The cover body 10 has a closing direction X and a cover end 12 in the closing direction. The cover body 10 can cover the pot body of the cooking device along the closing direction X. To clearly show the structure of the lid of the cooking device, the cover body 10 in FIG. 1 is at the open state relative to the pot body. The cover body 10 can move from the open state along the closing direction X. facing the opening of the pot body, then the cover body 10 can cover the opening of the pot body (see FIG. 3).

Figure 2:
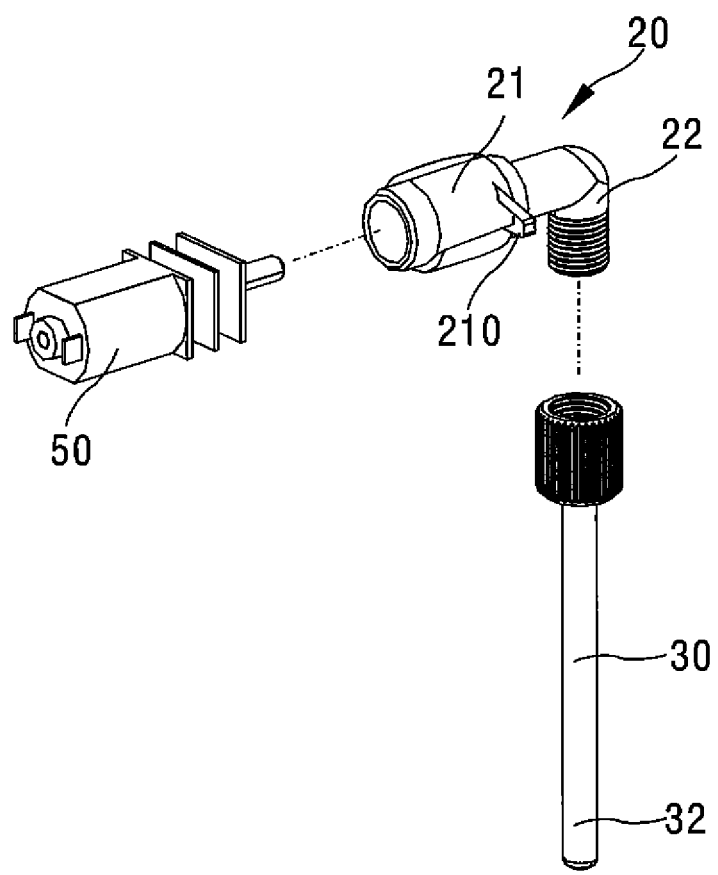
FIG. 2 is a partial exploded view of the lid in FIG. 1.

FIG. 2 is a partial exploded view of the lid in FIG. 1. Refer to FIG. 1 and FIG. 2, the rotating member 20 comprises a rotating portion 21 and a connecting portion 22. The rotating portion 21 is rotatable relative to the cover body 10 and disposed at the cover end 12. The rotational axis of the rotating portion 21 is perpendicular to the closing direction X. The connecting portion 22 is disposed at the rotating portion 21 and extends perpendicularly to the rotational axis of the rotating portion 21. In an exemplary embodiment, the rotating portion 21 and the connecting portion 22 are both cylindrical. The axial direction of the rotating portion 21 is perpendicular to the axial direction of the connecting portion 22. The rotating portion 21 and the connecting portion 22 are rotatable about the axis of the rotating portion 21.

Figure 3:
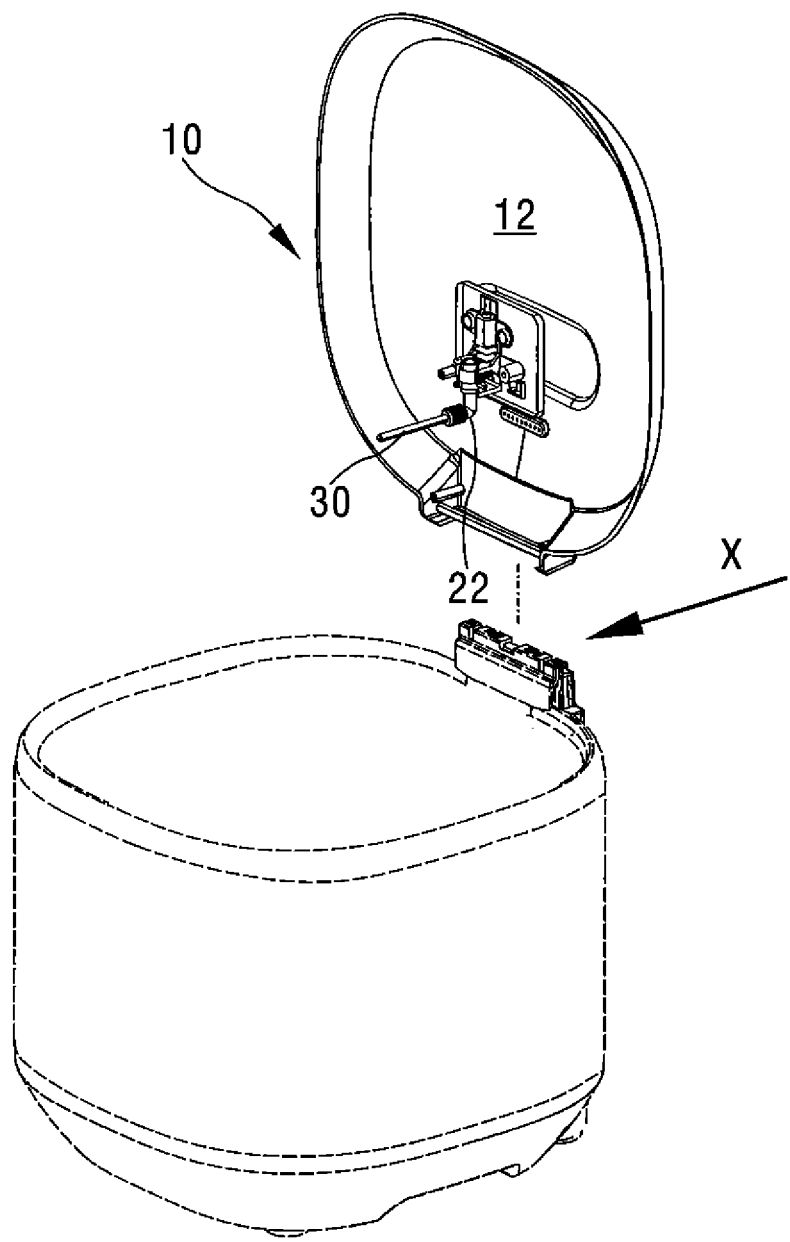
FIG. 3 illustrates that the sensor on an exemplary lid is at the working position.
Figure 4:
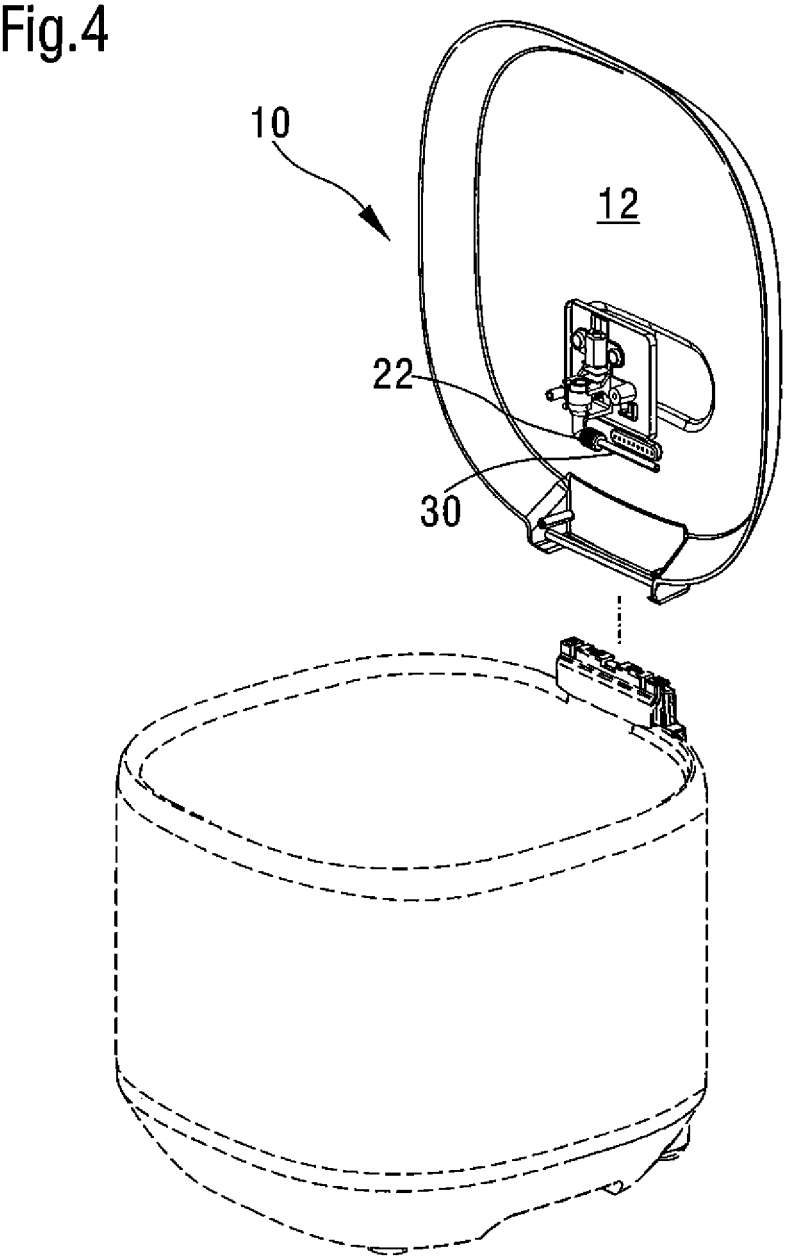
FIG. 4 illustrates that the sensor on an exemplary lid is at the inoperative position.

FIG. 3 illustrates that the sensor on an exemplary lid is at the working position. FIG. 4 shows that the sensor on an exemplary lid is at the inoperative position. Refer to FIG. 3 and FIG. 4, the sensor 30 is disposed at the connecting portion 22. Driven by the rotating portion (21), the sensor 30 can rotate between the inoperative position near the cover end 12 and the working position away from the cover end 12 under the. As shown in FIG. 3, when the sensor 30 is at the working position away from the cover end 12, the sensor 30 is substantially perpendicular to the plane in which the cover end 12 of the lid is located. As shown in FIG. 4, when the sensor 30 is in the inoperative position near the cover end 12, the sensor 30 is substantially parallel to the plane in which the cover end 12 of the lid is located.

Figure 5:
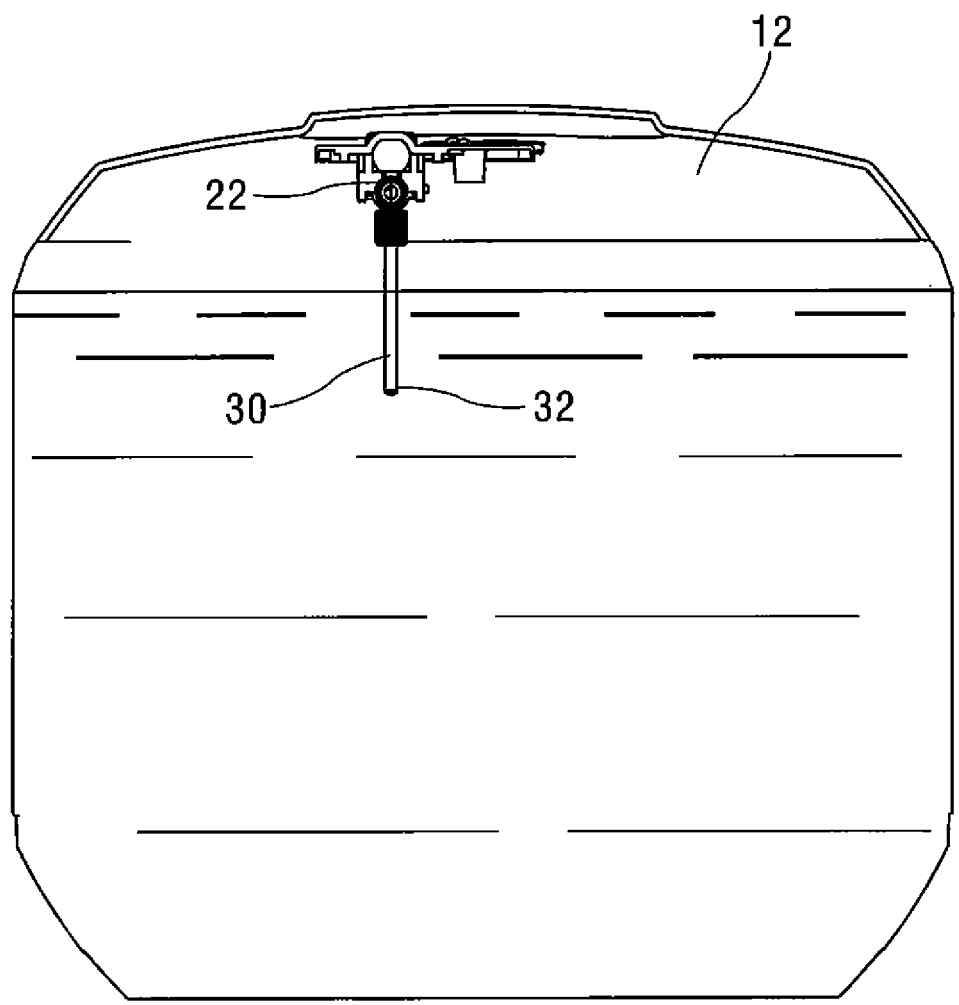
FIG. 5 illustrates that an exemplary lid is at the working status.
Figure 6:
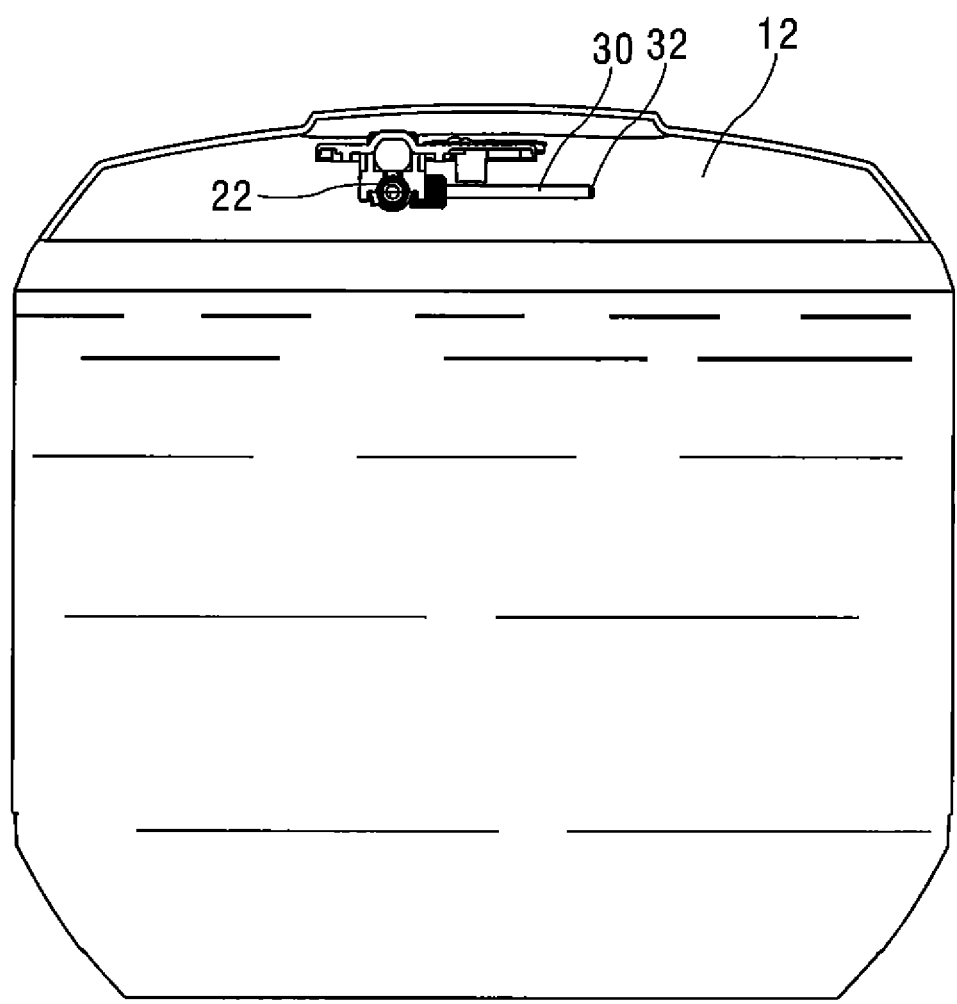
FIG. 6 illustrates another working status of the lid.

FIG. 5 and FIG. 6 illustrate that an exemplary lid is at the working status. Refer to FIG. 5 and FIG. 6, the sensor 30 is a tubular structure having a temperature measuring end 32 moving away from the cover end 12 and into the cooking device as the rotating portion 21 rotates. The temperature measuring end 32 can also approach the cover end 12 as the rotating portion 21 rotates. Via the rotating portion rotating in different directions (clockwise or counterclockwise), the temperature measuring end 32 of the sensor is close to or away from the cover end. As shown in FIG. 5, the temperatures measuring end 32 measures temperature when away from the cover end. At this time, the sensor 30 is used to detect the temperature of the food in the cooking device. As shown in FIG. 6, when the temperature measuring end 32 is close to the cover end, the sensor is retracted into the cover end. Therefore, the sensor is less likely to be damaged and space is saved when the sensor is withdrawn.

Figure 7:
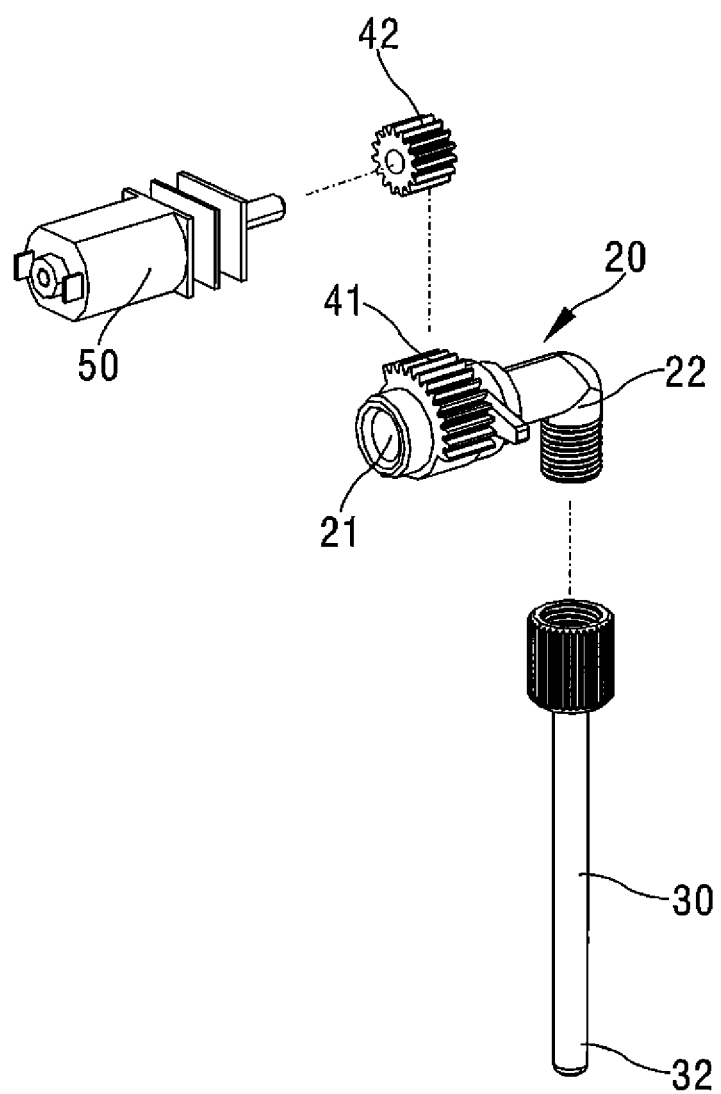
FIG. 7 is an exploded view of another exemplary embodiment of part A in FIG. 1.

FIG. 7 is an exploded view of another exemplary embodiment of part A in FIG. 1. As shown in FIG. 7, the lid further comprises a transmission gear 41, a drive gear 42, and a driving member 50. The transmission gear 41 is sleeved on the rotating portion 21. The drive gear 42 is rotatably disposed at the cover end 12 and meshes with the transmission gear 41. The outer diameter of the drive gear 42 is smaller than the outer diameter of the transmission gear 41. The driving member 50 is capable of driving the drive gear 42 to rotate. Since the gear with a large outer diameter is driven by the gear with a small outer diameter, the rotation speed of the rotating portion 21 is reduced to achieve a stable rotation of the rotating portion 21 and good quality of the cooked food, especially the rice.

As shown in FIG. 7, the driving member 50 is a motor in an exemplary embodiment. The motor can be a geared motor. The drive gear 42 is sleeved on the drive end of the motor. The motor can be mounted directly on the cover body 10 of the lid. A stopper 210 is further disposed on the rotating portion 21. When the sensor is at the inoperative position near the cover end 12, the sensor is parallel to the plane in which the cover end of the lid and the stopper abuts against the lid or other components on the lid to make the sensor locating substantially parallel to the cover end 12.

In an exemplary embodiment, the lid further comprises a controller (not shown) which is capable of acquiring temperature information measured by the sensor 30. The controller is also capable of controlling the rotation of the motor.

When the cooking device is off work, the sensor 30 is at the inoperative position.

When the cooking device start to work and a temperature measurement is desired, the controller controls the rotation of the motor which drives the rotating portion 21 to rotate, then the sensor 30 is driven away from the cover end 12 (the inoperative position) and to the working position (as shown in FIG. 3). Thus, the temperature measuring end 32 of the sensor 30 can extend into the food, which is being cooked in the cooking device, to detect the food temperature accurately. When the sensor 30 is detecting the food temperature, the controller collects the temperature information measured by the sensor 30 at the same time.

After measuring the temperature, the controller controls the motor to reversely rotate, and the motor drives the rotating portion 21 to rotate 90 degrees; so that the sensor 30 is driven to close the cover end 12 reaching the inoperative position (as shown in FIG. 4). In an exemplary embodiment, the cover end 12 of the cover body 10 is provided with a recess for accommodating the sensor 30. When the sensor 30 is near the cover end 12, it can be received into the recess 12.

Figure 8:
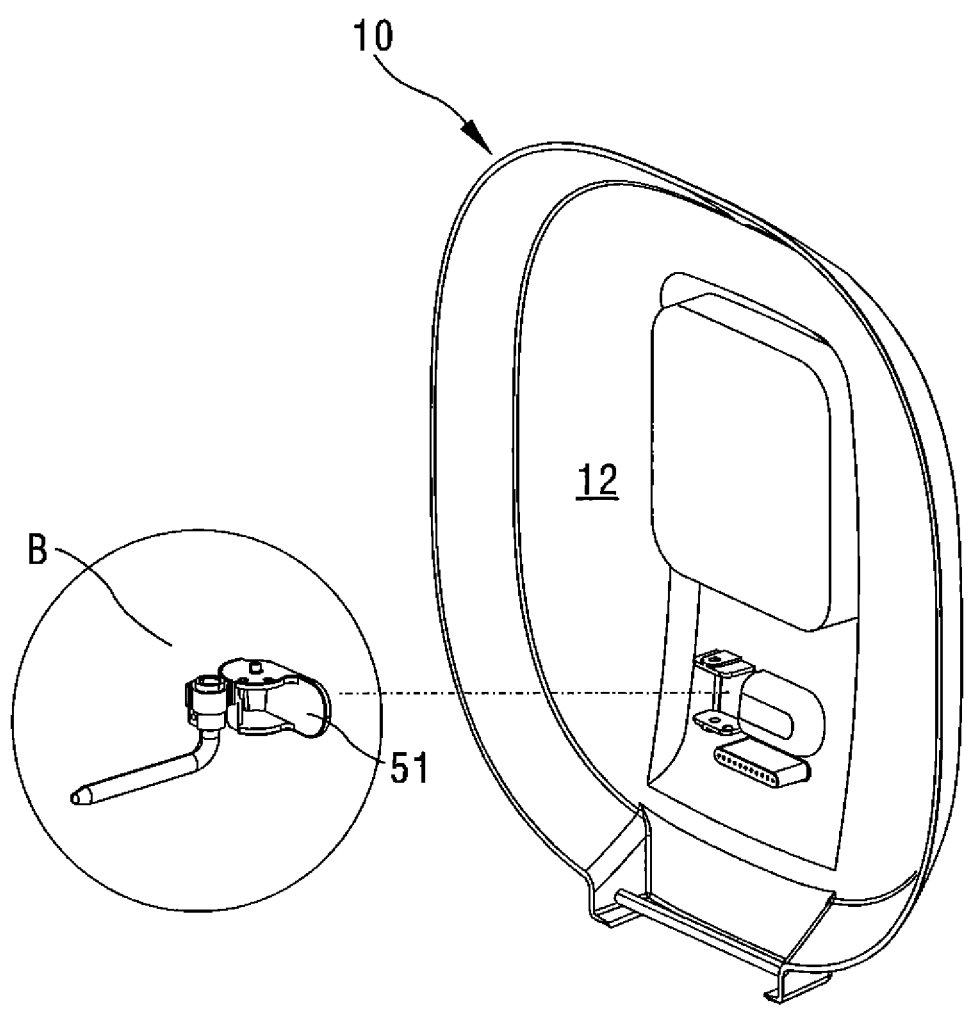
FIG. 8 is an exploded view of another exemplary embodiment of the lid.
Figure 9:
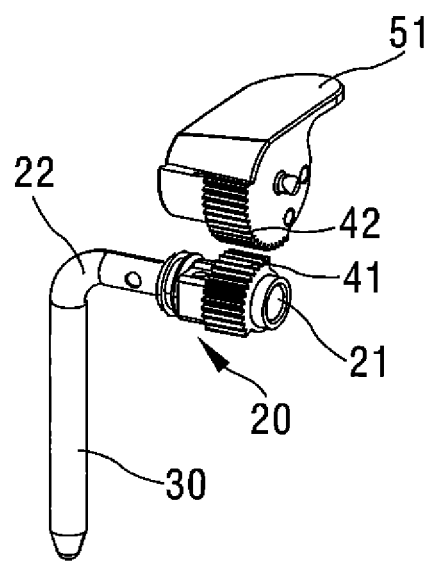
FIG. 9 is a partial exploded view of the lid in FIG. 8.

FIG. 8 is an exploded view of another exemplary embodiment of the lid. FIG. 9 is a partial exploded view of the lid in FIG. 8. In an exemplary embodiment, the drive gear 42 is not driven by a motor, and the cover body 10 further comprises a rod 51 which connects the drive gear 42 as shown in FIG. 8. The rod 51 is through the cover body 10.

Figure 10:
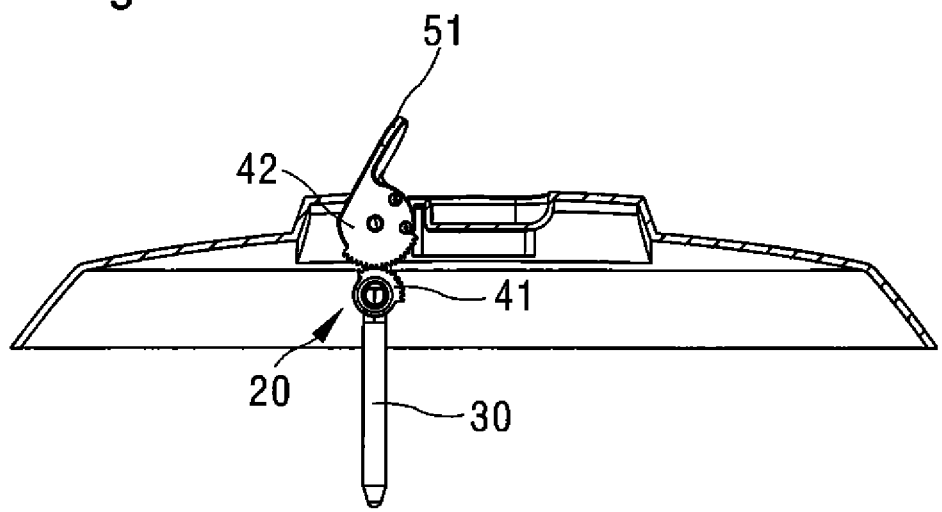
FIG. 10 illustrates that the sensor on an exemplary lid in FIG. 9 is at the working position.
Figure 11:
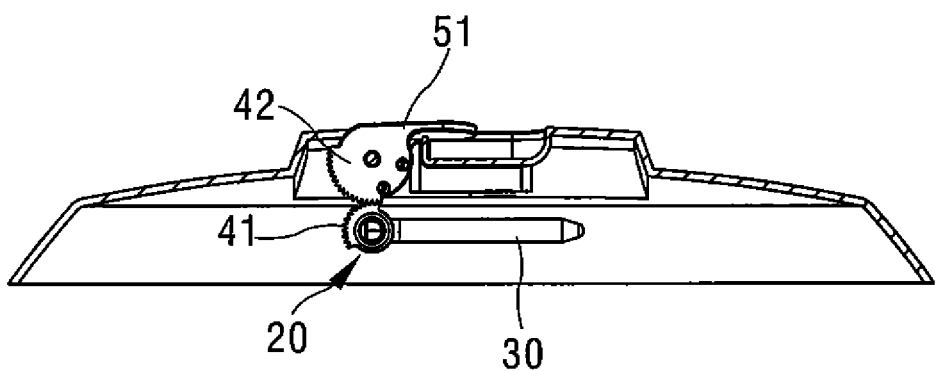
FIG. 11 illustrates that the sensor on an exemplary lid in FIG. 9 is at the inoperative position.

FIG. 10 illustrates that the sensor on an exemplary lid in FIG. 9 is at the working position. FIG. 11 illustrates that the sensor on an exemplary lid in FIG. 9 is at the inoperative position. Referring to FIG. 10 and FIG. 11, the user can rotate the drive gear 42 by pulling the rod 51; thereby the sensor 30 rotates between the working position and the inoperative position. In an exemplary embodiment, the rod 51 and the drive gear 42 can be integrated into one body. The upper half of the drive gear 42 is connected to a projection. The projection functions as the rod.

In an exemplary embodiment, there is also provided a cooking device comprising a lid and a pot body having an opening. The structure of the lid is as mentioned above. The lid is capable of covering the opening along the closing direction X. The cooking device herein includes rice cooker, slow cooker, deep fryer, airfryer and the like.

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

What is claimed is:

1. A lid for a cooking device, characterized in that the lid comprises:
   a cover body, which has a cover end in a closing direction,
   a rotating member, which comprises:
      a rotating portion, which is rotatably disposed at the cover end, and the rotational axis of the rotating portion is perpendicular to the closing direction, and
      a connecting portion, which is disposed at the rotating portion and extends perpendicularly to the rotational axis of the rotating portion; and
   a sensor, which is disposed at the connecting portion; driven by the driving of the rotating portion, the sensor can rotate between an inoperative position near the cover end and a working position away from the cover end, and
   wherein the lid further comprises a transmission gear, which is sleeved on the rotating portion;
   a drive gear, which is rotatably disposed at the cover end and meshes with the transmission gear, wherein the outer diameter of the drive gear is smaller than the outer diameter of the transmission gear; and
   a driving member, which drives the drive gear to rotate.

2. The lid according to claim 1, wherein the driving member is a motor.

3. The lid according to claim 2, wherein the lid further comprises a controller, which is configured to acquire temperature information measured by the sensor and control the rotation of the motor.

4. The lid according to claim 1, wherein the driving member is a rod that is threaded through the cover body, and one end of the rod connects to the drive gear.

5. The lid according to claim 1, wherein the cover end of the cover body is configured with a recess for receiving the sensor.

6. The lid according to claim 1, wherein the rotating portion is provided with a stopper extending perpendicular to the rotational axis of the rotating portion.

7. A cooking device, characterized in that the cooking device comprises:
   a pot body having an opening; and
   a lid according to any one of claims 1 to 6, wherein the lid is configured to cover the opening along the closing direction.

\* \* \* \* \*